United States Patent [19]

Yamatani et al.

[11] Patent Number: 5,400,670
[45] Date of Patent: Mar. 28, 1995

[54] APPARATUS FOR CONTROLLING AUTOMATIC TRANSMISSION FOR VEHICLE

[75] Inventors: Tadashi Yamatani; Takashi Arai; Shoichi Tanizawa, all of Wako, Japan

[73] Assignee: Honda Giken Kogyo Kabushiki Kaisha, Tokyo, Japan

[21] Appl. No.: 51,217

[22] Filed: Apr. 23, 1993

[30] Foreign Application Priority Data

Jun. 4, 1992 [JP] Japan ................................. 4-144423

[51] Int. Cl.⁶ ............................................. F16H 61/04
[52] U.S. Cl. .................................. 74/336 R; 477/117
[58] Field of Search ............. 74/335, 336 R; 477/116, 477/117

[56] References Cited

U.S. PATENT DOCUMENTS

| | | | |
|---|---|---|---|
| 4,984,485 | 1/1991 | Kojima et al. | 477/116 |
| 4,989,477 | 2/1991 | Hunter et al. | 74/336 R |
| 5,094,128 | 3/1992 | Kamada | 477/117 |
| 5,224,398 | 7/1993 | Sasaki | 477/116 |

FOREIGN PATENT DOCUMENTS

| | | |
|---|---|---|
| 0175212A1 | 3/1986 | European Pat. Off. |
| 4020340A1 | 1/1991 | Germany . |
| 4291684T1 | 5/1993 | Germany . |
| 50-709 | 1/1975 | Japan . |
| 3-69018 | 10/1991 | Japan . |

OTHER PUBLICATIONS

Patent Abstracts of Japan, vol. 010, No. 234 (M–507), Aug. 14, 1986, & JP–A–61 065 951.
Patent Abstracts of Japan, vol. 013, No. 140 (M–810), Apr. 6, 1989, & JP–A–63 303 251.
Patent Abstracts of Japan, vol. 009, No. 029 (M–356), Feb. 7, 1985, & JP–A–59 175 658.
Patent Abstracts of Japan, vol. 014, No. 198 (M–965), Apr. 23, 1990, & JP–A–20 38 750.
Patent Abstracts of Japan, vol. 014, No. 347 (M–1002), Jul. 26, 1990, & JP–A–21 20 557.

*Primary Examiner*—John J. Vrablik
*Attorney, Agent, or Firm*—Nikaido, Marmelstein, Murray & Oram

[57] ABSTRACT

In an apparatus for controlling an automatic transmission for a vehicle in which, at the time of gear engagement due to changing over from a reverse range or a neutral range to a forward range, a speed-change stage of the automatic transmission is shifted down to a low-speed stage after once setting it to a predetermined high-speed stage. The apparatus has a detector for detecting an amount of slippage of high-speed stage engaging elements which establish the high-speed stage and a control device for controlling to shift down, at the time of gear engagement, to the low-speed stage after the amount of slippage of the high-speed stage engaging elements has lowered to a predetermined value or smaller.

8 Claims, 3 Drawing Sheets

APPARATUS FOR CONTROLLING AUTOMATIC TRANSMISSION FOR VEHICLE

FIELD OF THE INVENTION

The present invention relates to an apparatus for controlling an automatic transmission for a vehicle and, in particular, to an apparatus for reducing a shock at the time of gear engagement or gear meshing.

BACKGROUND OF THE INVENTION

As this kind of apparatus, there is conventionally known in Japanese Published Examined Patent Application No. 709/1975 an apparatus in which, at the time of gear engagement or gear meshing due to changing over from a neutral range to a forward range, the speed-change stage of the automatic transmission is first set to a predetermined high-speed stage and is then down-shifted to a low-speed stage, to prevent a large driving force by the low-speed stage from being suddenly transmitted, thereby reducing the shock at the time of gear engagement. In this prior art, in order to securely perform the down-shifting via the high-speed stage at the time of gear engagement, an arrangement is made so that the high-speed stage is maintained until a predetermined time has elapsed from the time of gear engagement, out of consideration of the time required for engagement of frictional engaging elements which establish the above-described predetermined high-speed stage.

However, the time required for the engagement of the frictional engaging elements varies with mechanical fluctuations of the automatic transmission, oil temperature, rotational speed of an engine, hydraulic engaging characteristics of the frictional engaging elements, or the like. Therefore, if the time for holding the speed-change stage to the high-speed stage is kept constant as described above, there may occur a case in which the automatic transmission is down-shifted before the frictional engaging elements for the high-speed stage are engaged, with the result that the shock at the time of gear engagement are not sufficiently reduced. On the other hand, if the time for holding the speed-change stage to the high-speed stage is prolonged, the down-shifting will be delayed, resulting in a poor starting characteristics.

Further, in Japanese Published Examined Japanese Patent Application No. 69018/1991, there is known an apparatus in which, at the time of gear engagement, an automatic transmission is maintained at a high-speed stage until the rotational speed of a turbine of a torque converter is down to a predetermined value. However, since the rotational speed of the turbine varies with the rotational speed of the engine, or the like, the frictional engaging elements for the high-speed stage may not necessarily be sufficiently engaged when the rotational speed of the turbine is down to the predetermined value. Further, since the engaging conditions of the frictional engaging elements at the time when the rotational speed of the turbine has lowered to the predetermined value are different between the time when the vehicle is completely stopped and the time when it is not, the time of engagement of the frictional engaging elements for the high-speed stage cannot accurately be determined from the rotational speed of the turbine alone.

OBJECT AND SUMMARY OF THE INVENTION

In view of the above-described disadvantages, an object of the present invention is to provide an apparatus in which the time of engagement of the frictional engaging elements for a high-speed stage can be accurately determined and in which the transmission is down-shifted from a high-speed stage to a low-speed stage at an appropriate timing, so that the shock at the time of gear engagement can securely be reduced without impairing the starting characteristics.

According to the present invention, the foregoing and other objects are attained by an apparatus for controlling an automatic transmission for a vehicle in which, at a time of gear engagement due to changing over from a reverse range or a neutral range to a forward range, a speed-change stage of the automatic transmission is shifted down to a low-speed stage after once setting it to a predetermined high-speed stage, the apparatus comprising: detecting means for detecting an amount of slippage of high-speed stage engaging elements which establish a high-speed stage; and control means for controlling to shift down, at the time of gear engagement, to the low-speed stage after the amount of slippage of the high-speed stage engaging elements has lowered to a predetermined value or smaller.

In a preferred embodiment, the above-described detecting means is arranged to detect rotational speeds of an input side and an output side, respectively, of the high-speed stage engaging elements and then to calculate the amount of slippage of the high-speed stage engaging elements from the rotational speeds. In this arrangement, the amount of slippage is calculated by the difference or ratio between the rotational speed of the input side and the rotational speed of the output side.

Even if the timing of engagement of the high-speed stage engaging elements at the time of gear engagement may vary due to mechanical fluctuations of the automatic transmission, or due to changes in the hydraulic oil temperature, rotational speed of the engine, or the like, or due to whether the vehicle is stopped or not, the timing of gear engagement can accurately be determined by checking the amount of slippage of the high-speed stage engaging elements. Therefore, by shifting down to the low-speed stage after the amount of slippage has lowered to the predetermined value or smaller, the low-speed stage can surely be established via the high-speed stage at an appropriate timing.

If the low-speed stage friction engaging elements which establish the low-speed stage are not engaged yet when the engagement of the high-speed stage engaging elements is released at the time of down shifting, the driving force which has so far been increased to a certain degree by the high-speed stage will be dropped or decreased and, consequently, the effect of speed changing via the high-speed stage will be reduced. In such a case, if an arrangement is made to hold the speed-change stage to the predetermined high-speed stage until a lapse of a predetermined time after the amount of slippage of the high-speed stage engaging elements has lowered to the predetermined value, the low-speed stage friction elements will be engaged within the predetermined time and, therefore, the low-speed stage will be established right after releasing of the high-speed stage engaging elements. Therefore, the driving force can be increased stepwise without a temporary decrease in the driving force.

Even if the amount of slippage in the high-speed stage engaging elements is lowered to the predetermined value or smaller, there is a possibility that the starting characteristics are impaired by sticking to or remaining in the high-speed stage if the lowering cannot be detected due to a failure in the detecting means, or the like. In order to solve this kind of disadvantage, it is preferable to provide means for shifting the speed-change stage down to the low-speed stage at a lapse of a predetermined time from the time of gear engagement, irrespective of the amount of slippage of the high-speed stage engaging elements.

BRIEF DESCRIPTION OF THE DRAWINGS

The above and other objects and the attendant advantages of the present invention will become readily apparent by reference to the following detailed description when considered in conjunction with the accompanying drawings wherein.

DETAILED DESCRIPTION OF A PREFERRED EMBODIMENT

Figure 1:
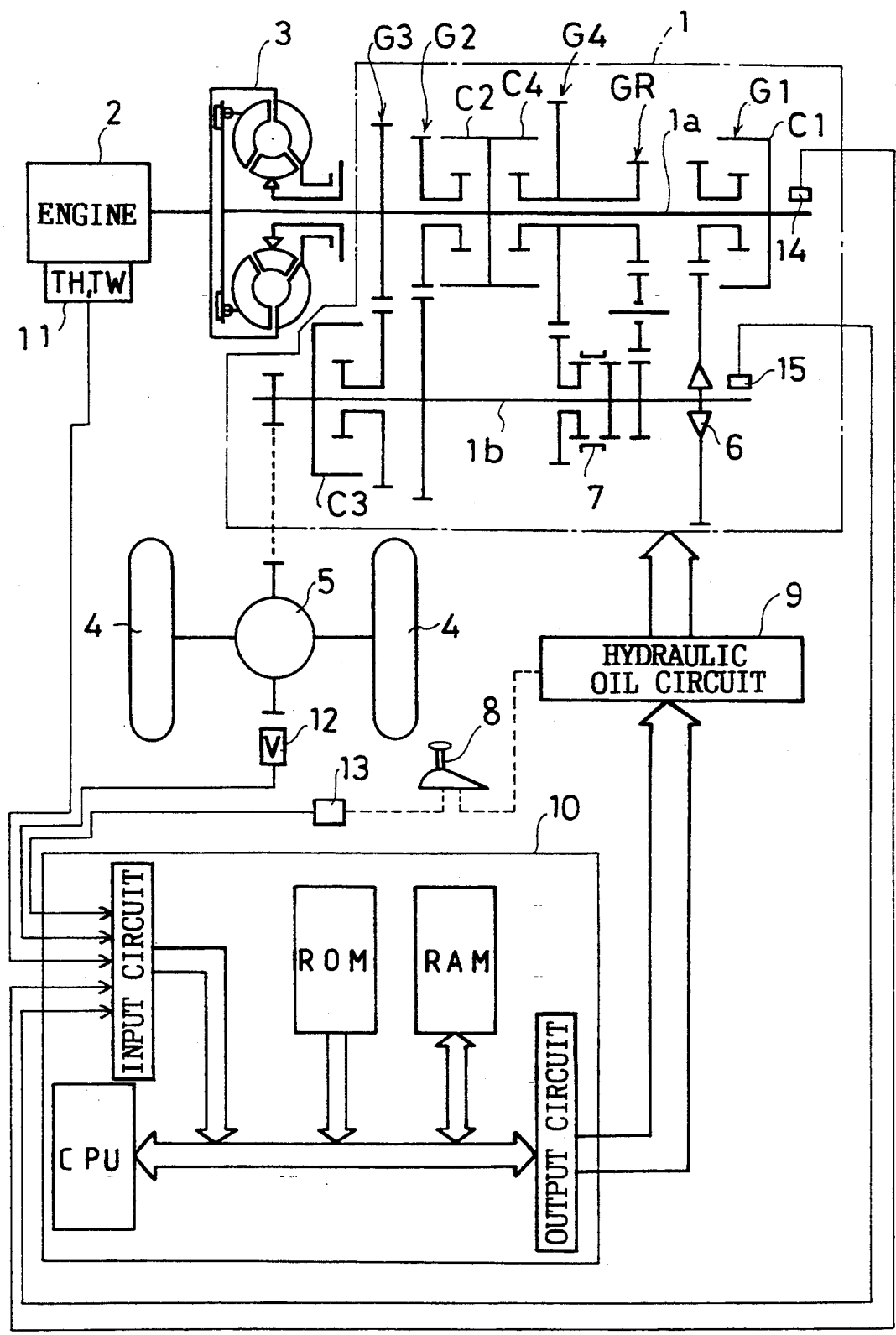
FIG. 1 is a diagram showing an example of the present invention apparatus.

Referring to FIG. 1, numeral 1 denotes a transmission for effecting the changing or shifting of a vehicle speed to four forward speeds and one reverse speed. The transmission 1 comprises: an input shaft 1a which is connected to an engine 2 via a fluid torque converter 3; an output shaft 1b which is connected to driving wheels 4 of the vehicle via a differential gear 5; and first- to fourth-speed forward gear trains G1, G2, G3, G4 and one reverse gear train GR, all gear trains being disposed between the input shaft 1a and the output shaft 1b. In each of the forward gear trains, there are interposed hydraulic engaging elements in the form of a hydraulic clutch C1, C2, C3, C4 respectively so that, through the engagement of each hydraulic clutch, each of the corresponding gear trains can be selectively established. There is further provided a one-way clutch 6 in the first-speed gear train G1 to allow for an overrotation of the output side. It is thus so arranged that, even if the first-speed hydraulic clutch C1 is engaged, there can be established another corresponding gear train when another hydraulic clutch is engaged. In addition, the reverse gear train GR and the fourth-speed gear train G4 use the clutch C4 in common by providing a selector 7 which operates to selectively engage the fourth-speed gear train G4 and the reverse gear train GR to the output shaft 1b. According to this arrangement, when the selector 7 is in the forward position on the left sidle of the Figure (the position as illustrated), the fourth-speed gear train G4 is established and, when it is changed over to the reverse position on the right side of the Figure, the reverse gear train GR is established.

Figure 3:
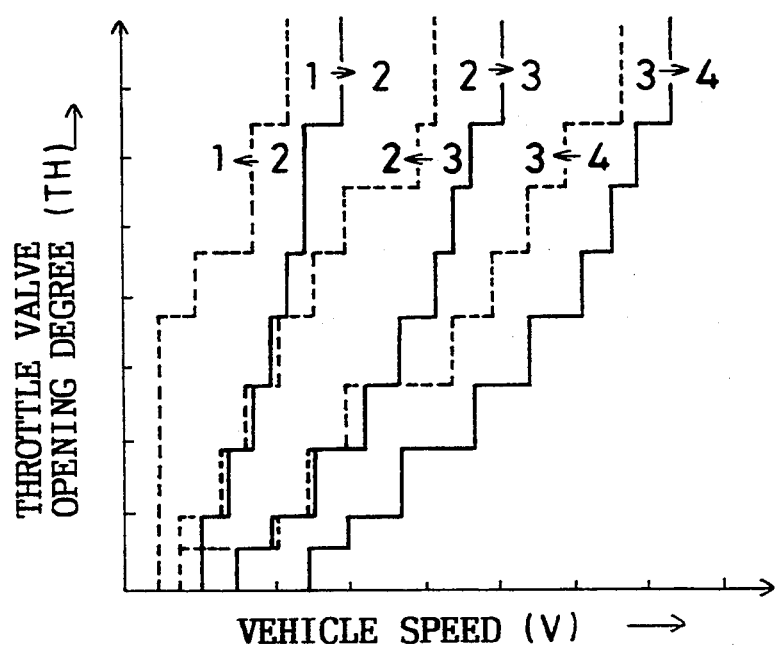
FIG. 3 is a diagram showing speed change characteristics under normal operation of a vehicle.

The above-described hydraulic clutches C1 through C4 are controlled by a hydraulic oil circuit 9 provided with manual valves (not illustrated) which are interlocked with a shift lever 8. Solenoid valves which are controlled by an electronic control circuit 10 (hereinafter called ECU) are integrated into the hydraulic oil circuit 9. The ECU 10 is input by signals from engine sensors 11 for detecting throttle valve opening degree TH, cooling water temperature TW or the like, speed sensors 12 for detecting the vehicle speed V, a position sensors 13 for detecting the changeover positions of the shift lever 8. When the shift lever 8 is changed over to the D range which is the forward range for automatic speed changing, an automatic speed changing from the first speed through the fourth speed is arranged to be carried out according to speed-change characteristics, as shown in FIG. 3, which are set in advance by selecting the throttle valve opening degree TH and the vehicle speed V as parameters.

At the time of gear engagement or gear meshing when the shift lever 8 is changed over from the N range which is the neutral range or the R range which is the reverse range to the D range, a second-speed signal is first output from the ECU 10 even if the driving conditions are in such a range as to establish the first-speed gear train. In this manner, the second-speed gear train G2 is established by supplying oil by the hydraulic oil circuit 9 to the first-speed hydraulic clutch C1 and the second-speed hydraulic clutch C2. Thereafter, by outputting the first-speed signal, the oil is discharged from the second-speed hydraulic clutch C2, thereby engaging only the first-speed hydraulic clutch C1 to establish the first-speed gear train G1. The driving force to be transmitted to the driving wheels 4 is increased stepwise to perform the so-called squat control which reduces a shock at the time of gear engagement.

The timing for down-shifting from the second-speed to the first-speed in this squat control is to be determined on the basis of an amount of slippage of the second-speed hydraulic clutch C2. To detect this amount of slippage, signals from a sensor 14 for detecting the rotational speed Nin of the input shaft 1a of the transmission 1 and from a sensor 15 for detecting the rotational speed Nout of the output shaft 1b are input to the ECU 10. Then, an amount of slippage is calculated by a difference or a ratio between the rotational speed of the output shaft 1b at the time when the second-speed is established and Nout, the rotational speed of the output shaft being obtainable by multiplying the Nin by a gear ratio r (=output/input) of the second-speed gear train G2. In this embodiment, the amount of slippage is calculated as a ratio of slippage ECL by the following formula:

$$ECL = r \cdot Nin/Nout$$

Figure 2:
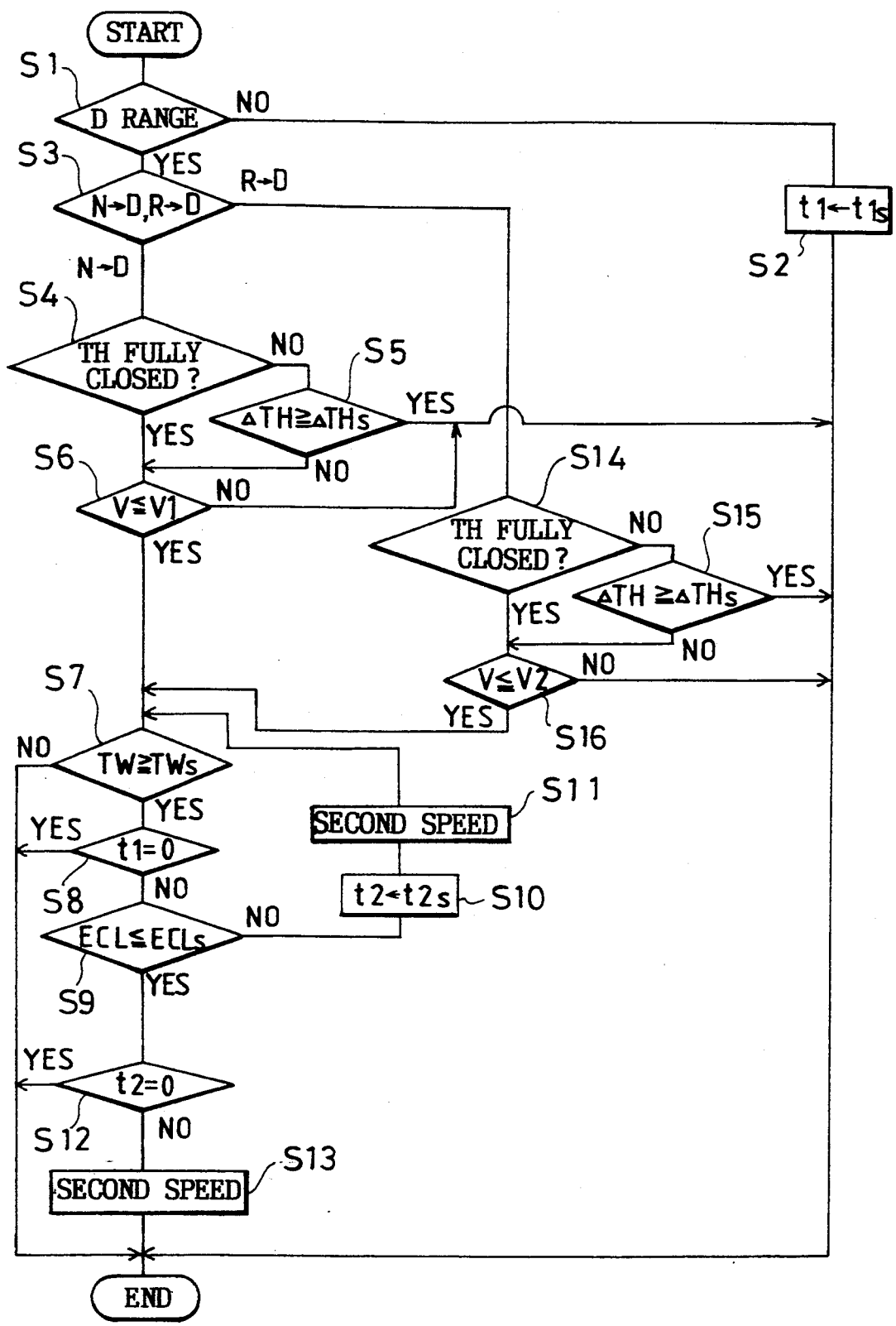
FIG. 2 is a flow chart showing a control program at the time of gear engagement.

Details of the squat control are as shown in FIG. 2. First, a determination is made in step S1 as to whether or not the shift lever 8 has been changed over to the D range. If the shift lever 8 is in a range other than the D range, the operation or procedure proceeds to step S2 and set the remaining time t1 of a first subtracting timer to a predetermined first set time t1s. On the other hand, if the shift lever 8 is in the D range, the operation proceeds to step S3 to determine whether the changeover is from the N range to the D range or from the R range to the D range. In the course of the changeover from the R range to the D range, the shift lever 8 passes through the N range. However, if the speed of passing therethrough is fast enough, a determination is made that the changeover is from the R range to the D range.

When the shift lever 8 is changed over from the N range to the D range, the operation proceeds to step S4 to determine whether or not the throttle valve opening degree TH is fully closed. When it is not fully closed, the operation proceeds to step S5 to determine whether or not the degree of increase ΔTH of the throttle opening degree is equal to or above a predetermined value $\Delta THs$. It is at the time when a driver depresses an acceleration pedal that the relationship $\Delta TH \geq \Delta THs$ is satisfied. Since, at such a time, it is considered that the driver has an intention of rapidly starting the vehicle, the squat processing is not carried out. When the TH is fully closed or $\Delta TH < \Delta THs$, the operation proceeds to step S6 to determine whether or not the vehicle speed V at the present time is below a first set value V1 which is a relatively low speed (e.g., 3 to 5 km/h with hysteresis). If $V \leq V1$, the operation proceeds to step S7 to determine whether or not the cooling water temperature TW is equal to or above a S9 predetermined value TWs. Since, at a low temperature condition when $TW < TWs$, the viscosity of oil is high and consequently the clutch pressure gradually increases, there will not occur a large shock even if the first-speed gear train G1 is established from the beginning at the time of gear engagement. Therefore, only when $TW \geq TWs$, the operation proceeds to step S8 to carry out the squat processing or operation.

At step S8 a determination is made as to whether or not the remaining time t1 of the first subtracting timer has become zero, i.e., whether the first set time t1s has elapsed after the time when the changeover to the D range was made. If the above-described time has not lapsed, the operation proceeds to step S9 to determine whether or not the ratio of slippage ECL of the second-speed hydraulic clutch C2 is below a predetermined value ECLs. If $ECL > ECLs$, the operation proceeds to step S10 to first set the remaining time t2 of a second subtracting timer to a predetermined set time t2s and then proceeds to step S11 to carry out the processing of establishing the second-speed gear train G2 by outputting a second-speed signal. According to this arrangement, the second-speed clutch C2 is supplied with hydraulic oil and its engaging force is gradually increased. As a consequence, the slipping in the second-speed clutch C2 is gradually decreased to perform a torque transmission by the second-speed gear train G2. When $ECL \leq ECLs$, the operation proceeds to step S12 to determine whether or not the remaining time t2 of the second subtracting timer has become zero, i.e., whether the above-described predetermined time t2s has lapsed from the time when the condition $ECL \leq ECLs$ was attained. If this time has not lapsed yet, the operation proceeds to step S13 to continue the operation of establishing the second-speed gear train G2 and, if this time has lapsed, this operation is stopped. According to this arrangement, a first-speed signal is output according to the speed-change characteristics shown in FIG. 3 and hydraulic oil is discharged from the second-speed hydraulic clutch C2. At this time, even if the clutching pressure of the first-speed hydraulic clutch C1 has not sufficiently been increased or boosted at the time when ECL has lowered to ECLs, the clutching pressure will sufficiently be increased within the above-described predetermined time t2s. The engagement of the first-speed clutch C1 will, therefore, be almost completed and, as a result of decrease in the clutching pressure of the second-speed clutch C2, the first-speed gear train G1 will quickly be established. In this manner, the driving force to be transmitted to the driving wheels 4 is increased stepwise without causing a temporary dropping at the time of down-shifting from the second-speed gear train G2 to the first-speed gear train G1, thereby reducing the shock at the time of gear engagement. In order to prepare for a possibility that the relationship $ECL \leq ECLs$ is not attained until after the lapse of a long period of time due to a failure in the second-speed clutch C2 or a failure in the sensors 14, 15, or the like, the following arrangement is made. Namely, when a determination has been made at step S8 that $t1 = 0$ after the lapse of the setting time t1s of the first subtracting timer from the time of gear engagement, the squat control is stopped. Instead, a first-speed signal according to the speed-change characteristics in FIG. 3 is output so that the starting of the vehicle at the first-speed gear train G1 can be made.

At the time of changing over from the R range to the D range, the operation proceeds from step S3 to step S14 to determine whether or not the throttle valve opening degree TH is fully closed. If it is found not fully closed, the operation proceeds to step S15 to determine whether or not the degree $\Delta TH$ of increase in the throttle opening is above the predetermined value $\Delta THs$. When the throttle valve opening degree TH is either fully closed or $\Delta TH < \Delta THs$, the operation proceeds to step S16 to determine whether the vehicle velocity V is below a second setting value V2 (e.g., 7-8 km/h with hysteresis) which is set higher than the above-described first setting value V1. When $V \leq V2$, the operation proceeds to step S7 to determine the cooling water temperature TW and, when $TW \geq TWs$, the squat processing as described in step 8 and downwards is carried out. It is generally when the shift lever 8 is rapidly changed over from the R range to the D range in order to escape or come out of a muddy field or the like that a determination is made that the changeover in question is from the R range to the D range. In such a case, since the vehicle speed V to be detected becomes high to a certain degree due to racing of the driving wheels 4, the second setting value V2 is set at a relatively high value as described above.

In the above-described embodiment, it has been arranged that the second-speed gear train G2 is established by the squat processing. However, a gear train of a higher speed other than the second speed may also be established. Furthermore, the present invention can also be applied to an automatic transmission of a planetary gear type.

It is readily apparent that the above-described apparatus for controlling an automatic transmission for a vehicle meets all of the objects mentioned above and also has the advantage of wide commercial utility. It should be understood that the specific form of the invention hereinabove described is intended to be representative only, as certain modifications within the scope of these teachings will be apparent to those skilled in the art.

Accordingly, reference should be made to the following claims in determining the full scope of the invention.

What is claimed is:

1. An apparatus for controlling an automatic transmission for a vehicle in which, at a time of gear engagement due to changing over from a reverse range or a neutral range to a forward range, a speed-change stage of said automatic transmission is shifted down to a low-speed stage after once setting it to a predetermined high-speed stage, said apparatus comprising:
   detecting means for detecting an amount of slippage of high-speed stage engaging elements which establish the high-speed stage; and
   control means for controlling to shift down, at the time of gear engagement, to the low-speed stage after said amount of slippage of said high-speed stage engaging elements has lowered to a predetermined value or smaller.

2. An apparatus for controlling an automatic transmission for a vehicle according to claim 1, further comprising means for shifting said speed-change stage down to said low-speed stage at a lapse of a predetermined time from the time of gear engagement, irrespective of said amount of slippage of said high-speed stage engaging elements.

3. An apparatus for controlling an automatic transmission for a vehicle according to claim 1, wherein said detecting means is arranged to detect rotational speeds of an input side and an output side, respectively, of said high-speed stage engaging elements and then to calculate said amount of slippage of said high-speed stage engaging elements from said rotational speeds.

4. An apparatus for controlling an automatic transmission for a vehicle according to claim 3, further comprising means for shifting said speed-change stage down to said low-speed stage at a lapse of a predetermined time from the time of gear engagement, irrespective of said amount of slippage of said high-speed stage engaging elements.

5. An apparatus for controlling an automatic transmission for a vehicle according to claim 3, wherein said control means is arranged to hold said speed-change stage to said high-speed stage until a lapse of a predetermined time after said amount of slippage of said high-speed stage engaging elements has lowered to the predetermined value.

6. An apparatus for controlling an automatic transmission for a vehicle according to claim 5, further comprising means for shifting said speed-change stage down to said low-speed stage at a lapse of a predetermined time from the time of gear engagement, irrespective of said amount of slippage of said high-speed stage engaging elements.

7. An apparatus for controlling an automatic transmission for a vehicle according to claim 1, wherein said control means is arranged to hold said speed-change stage to said predetermined high-speed stage until a lapse of a predetermined time after said amount of slippage of said high-speed stage engaging elements has lowered to the predetermined value.

8. An apparatus for controlling an automatic transmission for a vehicle according to claim 7, further comprising means for shifting said speed-change stage down to said low-speed stage at a lapse of a predetermined time from the time of gear engagement, irrespective of said amount of slippage of said high-speed stage engaging elements.

* * * * *